United States Patent Office 2,928,872
Patented Mar. 15, 1960

2,928,872
DIALKYLAMINOALKYL HYDANTOAMIDES

Seymour L. Shapiro, Hastings on Hudson, and Louis Freedman, Bronxville, N.Y., assignors to U.S. Vitamin and Pharmaceutical Corporation, New York, N.Y., a corporation of Delaware No Drawing. Application December 29, 1958
Serial No. 783,096

6 Claims. (Cl. 260—553)

This invention is concerned with dialkylaminoalkyl hydantoamides of the following formula

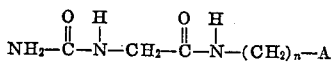

wherein A is a secondary amino radical having a total carbon content of $C_2$-$C_6$, and $n$ is a small whole number in the range 2–4.

The compounds of this invention are strong bases and can also form stable acid addition salts with the mineral acids such as hydrochloric acid, hydrobromic acid, sulfuric acid and the like, as well as with the strong organic acids such as acetic acid, lactic acid, nicotinic acid, fumaric acid and the like.

In addition, the nitrogen of the amino group A can be quaternized with such compounds as methyl iodide, ethyl bromide or ethyl bromoacetate to yield quaternary ammonium salts.

The compounds of this invention are stable, water-soluble, crystalline solids with useful pharmacological properties, particularly as anti-inflammatory agents, and as central nervous system depressants. Coupled with these properties there is the additional attribute of a very low order of toxicity.

The compounds are conveniently prepared by reaction of the amine, $A(CH_2)_nNH_2$, with ethyl hydantoate in a lower alcohol. After a suitable storage period, the product is precipitated from the reaction mixture by addition of a solvent such as ether or ethyl acetate.

The following examples illustrate the present invention but are not to be construed as limiting.

Example 1

A mixture of 10.0 g. (0.0684 mole) of ethyl hydantoate, 60 ml. of methanol and 9.3 g. (0.080 mole) of diethylaminoethylamine was stored at 20° C. for 15 days, when a trial titration had established that virtually complete reaction had occurred. The reaction mixture was diluted with 700 ml. of ether and the product, the N-(diethylaminoethyl)-hydantoamide, 8.6 g. (58%) precipitated, M.P. 143–147° C., which upon recrystallization (ethanol-ethyl acetate), melted at 145–147° C.

*Analysis.*—Calcd. for $C_9H_{20}N_4O_2$: C, 50.0; H, 9.3; N, 25.9. Found: C, 50.1; H, 8.9; N, 26.3.

Upon treatment with one equivalent of alcoholic hydrogen chloride, the hydrochloride of the compound is obtained.

This compound with a minimal lethal dose of >1000 mg./kg. subcutaneous in mice shows anti-inflammatory activity of 9 units per gram (see Shapiro et al., J. Am. Pharm. Assoc., Sci. Ed., 46, 333 (1957) for reference to method used), and a depression of the central nervous system of 26.4 percent at 100 mg./kg. subcutaneous (see Shapiro et al., J. Am. Chem. Soc., 80, 1648, (1958) for referenec to method used).

In a similar manner and using dimethylaminoethylamine, there is obtained N-(dimethylaminoethyl)hydantoamide.

Example 2

In a similar manner to that described in Example 1, and using dimethylaminopropylamine, there is obtained N-(dimethylaminopropyl)hydantoamide in 47% yield, M.P. 163–167° C.

*Analysis.*—Calcd. for $C_8H_{18}N_4O_2$: C, 47.5; H, 9.0; N, 27.7. Found: C, 47.6; H, 8.9; N, 27.4.

The solution of the above compound in ethanol-ethyl acetate treated with an excess of methyl iodide yielded a white precipitate of the methiodide quaternary salt, M.P. 205–206° C.

*Analysis.*—Calcd. for $C_9H_{21}IN_4O_2$: C, 31.4; H, 6.2. Found: C, 31.4; H, 6.0.

In a similar manner, using the appropriate secondary aminoalkylamine there is obtained N-(diethylaminopropyl)hydantoamide, N-(pyrrolidinopropyl)-hydantoamide, N-([4-morpholino]propyl)hydantoamide and N-(piperidinopropyl)-hydantoamide.

The novel compounds of this invention can be combined with solid or liquid pharmaceutical carriers and formulated into the form of tablets, powder packets or capsules, or dissolved in suitable solvents for oral and parenteral administration for human or veterinary use.

It is to be understood that it is intended to cover all changes and modifications of the examples herein chosen for the purpose of illustration which do not constitute departures from the spirit and scope of the invention.

We claim:

1. A compound selected from the class consisting of the free base, non-toxic mineral acid addition salt and methyl iodide quaternary salt, said free base having the formula

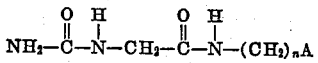

wherein A is a member of the group consisting of dimethylamino and diethylamino, and $n$ is an integer selected from the group consisting of 2 and 3.

2. The compound

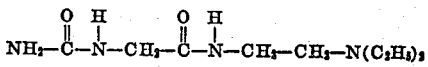

3. The compound

4. The compound

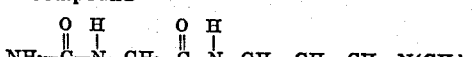

5. The compound

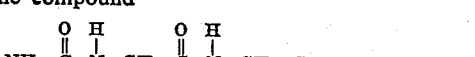

6. The compound

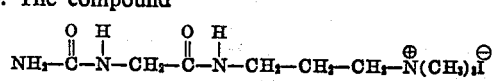

No references cited.